Oct. 28, 1952 G. HYLTÉN-CAVALLIUS 2,615,408
APPARATUS FOR SOWING SEEDS
Filed Sept. 3, 1949 3 Sheets—Sheet 1
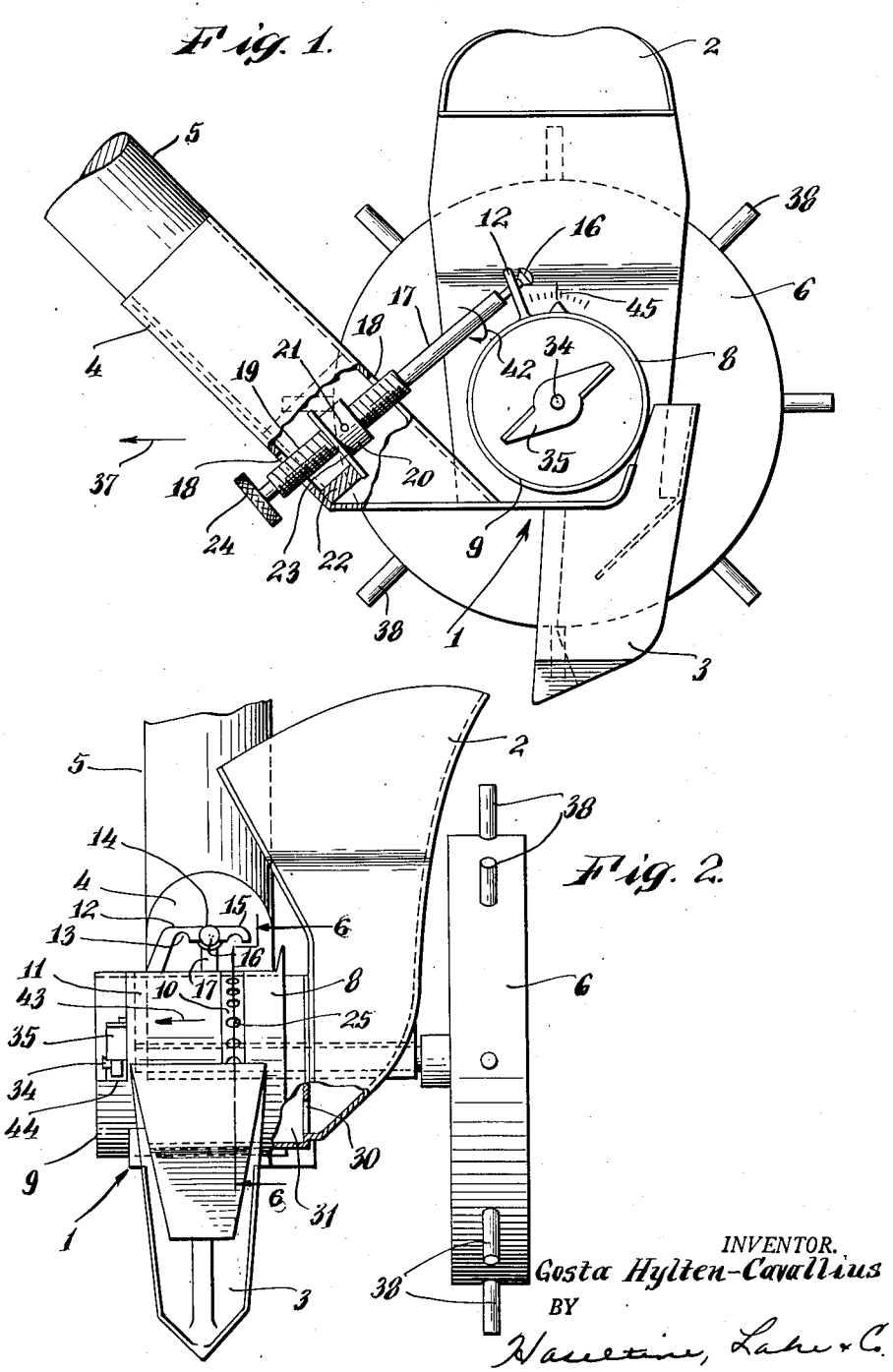
INVENTOR.
Gösta Hyltén-Cavallius
BY
Haseltine, Lake & Co.
AGENTS.

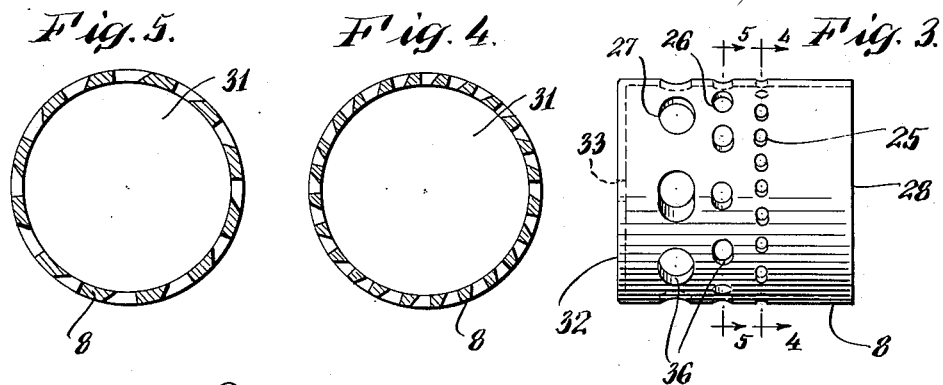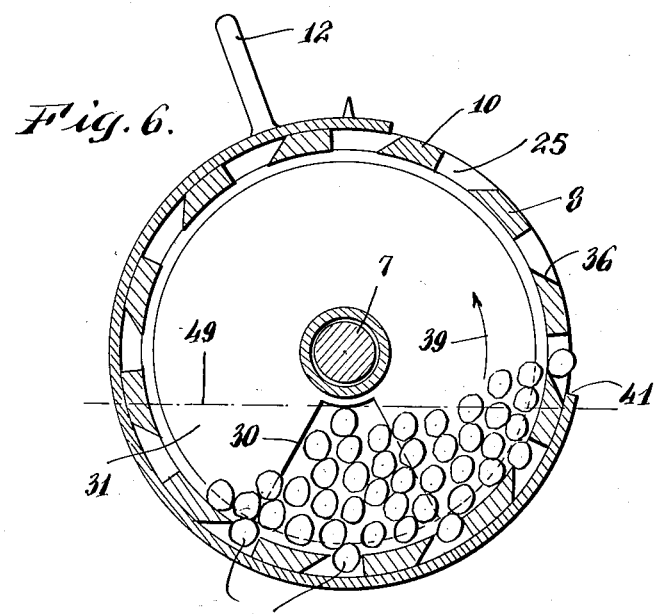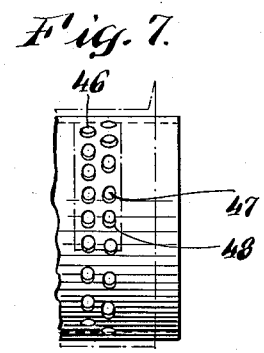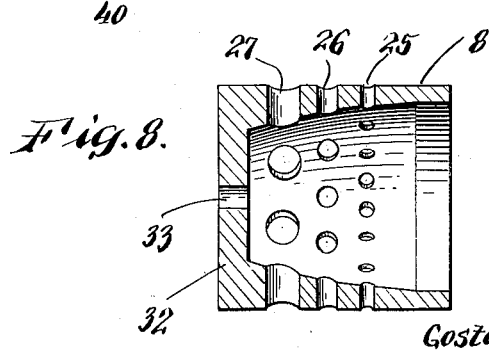

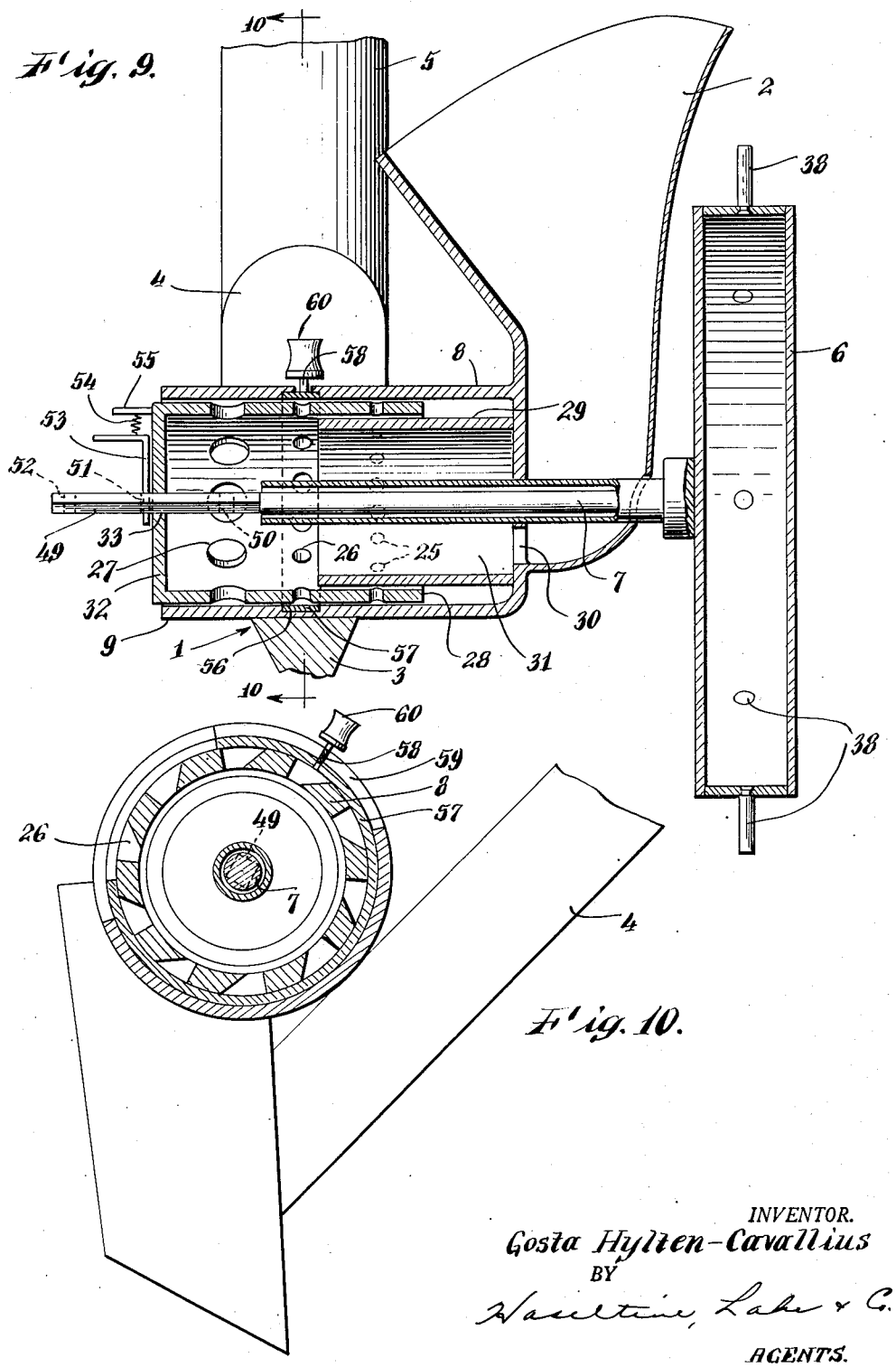

Patented Oct. 28, 1952

2,615,408

UNITED STATES PATENT OFFICE 2,615,408

APPARATUS FOR SOWING SEEDS

Gösta Hyltén-Cavallius, Malmo, Sweden

Application September 3, 1949, Serial No. 113,963
In Sweden September 3, 1948

12 Claims. (Cl. 111—78)

1

The present invention relates to an apparatus for sowing seed comprising a seed drum rotatably mounted in the frame of the apparatus and having outlets along its circumference, said drum being mounted in a housing provided with at least one aperture or recess through which the seed corns coming from the outlets can be led to a sowing chute.

Apparatus of this type are known which comprise a cylindrical housing in which a seed drum is mounted being in connection with a storage tank for the seed and being rotatably mounted. In the wall of this drum a row of outlets is provided, and in the housing there is an aperture leading to a sowing chute, over the lower edge of which aperture the outlets in the seed drum discharge the seed mass in the form of individual seed corns or seed portions received in the outlets during rotation of the drum.

Although such sowing apparatus have many good qualities they have not been widely used owing to the fact that they also suffer from various inconveniences. By means of sowing apparatus of said type a uniform sowing may be had, but it is impossible to set the apparatus for a more or less dense sowing unless the seed drum be exchanged by another drum having the outlets spaced differently apart.

The object of the invention is to provide an apparatus for sowing seed of the above type in which it is possible, in connection with most types of seed met with including grain, and legumes, to control the discharged amount of seed within ample limits.

The apparatus according to the invention is essentially characterized by an adjustable overflow edge by means of which the level at which the aperture of the housing uncovers the outlets can be adjusted. It has been found that by adjusting said level a control of the sowing amount is simultaneously obtained.

According to the invention the overflow edge may preferably consist of the lower edge of the aperture in the housing when this is pivotally mounted concentric with the seed drum so that when swinging the housing concentric with the seed drum during adjustment of the housing an adjustment of the level of said overflow edge is simultaneously obtained.

According to the invention the overflow edge may also consist of one free edge of a special guide plate mounted between the housing and the seed drum so that the housing itself may be firmly connected to the frame of the apparatus and the adjustment may be made by adjusting said guide plate.

2

These and other features of the invention will appear from the following description of some embodiments of the apparatus according to the invention with reference to the drawings, in which Figs. 1 and 2 are two elevations perpendicular to one another of an embodiment of the apparatus according to the invention, Fig. 3 a side elevation of a seed drum, Fig. 4 a cross section along the line 4—4 in Fig. 3, Fig. 5 a cross section along the line 5—5 in Fig. 3, Fig. 6 at a larger scale a section along the line 6—6 in Fig. 2, Fig. 7 an outer view of part of a second embodiment of the seed drum, Fig. 8 a longitudinal section through a third embodiment of the seed drum, Fig. 9 a longitudinal section through another embodiment of the apparatus according to the invention, and Fig. 10 a section along the line 10—10 in Fig. 9.

The apparatus shown in Figs. 1 to 5 comprises a frame 1 on which is secured a storage tank 2, a sowing chute 3 and an operating member in the form of a short pipe 4 for a handle 5.

A wheel 6 and an interchangeable seed drum 8 connected to the wheel 6 by means of a shaft 7 are rotatably mounted in the frame 1. The drum 8 is surrounded by a pivotally mounted and axially slidable case or housing 9 provided with an aperture 10 and a recess 11. On the housing 9, which does not rotate with the seed drum 8, a bell crank lever 12 is secured. At its lower edge said lever has three notches 13, 14 and 15 for engagement with the free end 16 of a rod 17 which in said position engages the lever 12 by means of a groove formed between two enlargements on the rod end. The rod 17 is carried through holes 18 in the pipe 4. The part of the rod 17 extending through the pipe 4 is threaded at 19 to engage with a block 20 having a threaded hole and being pivotally mounted in the pipe 4 by means of two pins 21 mounted in the wall of the pipe 4 or in any other suitable manner. Through an arm or disc 23 secured to the block 20 said block is influenced by a coil spring 22 also mounted in the pipe 4. By means of a setting wheel 24 the rod 17 may be rotated and thereby screwed more or less off relatively to the block. Owing to the pivoting of the block 20 the rod 17 may itself oscillate but is ordinarily held by the spring 22 in engagement with the lever 12.

The seed drum 8 removably mounted on the shaft 7 is in the embodiment shown provided with three rows of outlets 25, 26 and 27. The outlets in the row 25 are dimensioned for sowing for instance cabbage seed or seed of like size. The outlets 26 are dimensioned for sowing radish seed or seed of similar size, etc. At one open end the seed drum 8 surrounds an annular flange 29 secured to the lower portion of the storage tank 2. Said annular flange partially limits an aperture 30 in the wall of the tank 2, said aperture, which essentially has the shape of a sector of a circle, being provided for connecting the storage tank to the hollow space 31 of the seed drum. At the other end of the seed drum, which is closed by a wall 32, a hole 33 is provided through which the free end of the shaft 7 extends. The free end 34 of the shaft 7 is turned down to a smaller diameter than the other part of the shaft so as to form a shoulder against which the wall 32 of the seed drum can bear so as to fix the position of the seed drum on the shaft. The end 34 of the shaft 7 is threaded for a wingnut 35 or like clamping member by means of which the seed drum may be clamped to the shaft 7.

The outlets of the cylinder 8 are made by boring radial holes and then chamfering one edge of said holes outwardly as at 36, for instance by milling.

The embodiment of the apparatus according to the invention as above described is substantially adapted for sowing in forcing frames or like places. During the use the apparatus is drawn in the direction indicated by the arrow 37, pins or ribs 38 on the wheel 6 thereby sinking down into the bed so that the wheel 6, the shaft 7, and the seed drum 8 clamped on the shaft by means of the wing nut 35 are caused to rotate. The storage tank contains the seed to be sown which through the aperture 30 runs into the hollow space in the seed drum 8. The aperture 30 only permits of so much seed entering the drum at a time that a certain approximately constant level is maintained therein. When rotating the seed drum 8 in the direction indicated by the arrow 39 the outlets 40 will receive seed corn, cf. Fig. 6, and carry the latter upwards so that the seed will pass over the lower edge 41 of the aperture 10 and fall down into the chute 3.

As explained above the seed drum in this embodiment has three rows of outlets 25, 26 and 27 for sowing seed of different types. In the position shown in Figs. 1 and 2 the apparatus is so set as to sow from the outlets in the row 25, i. e. the row adapted to sow for instance cabbage seed. The setting of the apparatus for sowing from the various rows of outlets separately is enabled by the housing 9 being axially slidable so that the aperture 10 or the recess 11 may be caused to uncover some of the outlets in the row to be used in each individual case, thus in the present case some of the outlets of the row 25. The housing 9 is held in the set position owing to the engagement of the rod 17 in one of the notches 13, 14 or 15 in the bell crank lever 12. If it is desired after sowing cabbage seed to sow for instance radish seed, the pivoted rod 17 is carried in the direction indicated by the arrow 42, see Fig. 1, against the action of the spring 22. The housing 9 is thereby released so as to slide in the direction indicated by the arrow 43, see Fig. 2, to a position in which the free end 16 of the rod 17 may engage with the notch 15 in the lever 12. The housing 9 will now be in such a position that the aperture 10 is opposite to the outlets in the row 26 corresponding to radish sowing, whereas the outlets in the other rows are covered by the housing so that no seed can be discharged through these outlets into the sowing chute.

If the apparatus shall be used for sowing seed through the outlets in the row 27, the housing 9 is displaced so far in a direction opposite that of the arrow 43 that the recess 11 will uncover the outlets 27. In this position the free end 16 of the rod 17 engages with the notch 13 in the lever 12.

The seed drum may easily be interchanged with another seed drum for sowing other types of seed, and for this purpose the wing nut 35 is screwed off from the shaft 7 so that the seed drum 8 becomes free and may be taken out in order that another seed drum of the same diameter but having outlets of different dimensions can be mounted on the shaft and clamped thereto by means of the wing nut 35.

The setting of the apparatus for varying the amounts of seed to be sown will be further described in the following. The amount of seed carried out through the outlets in the seed drum to the sowing chute is determined by the position of the lower edges 41 and 44 respectively of the aperture 10 or the recess 11 relatively to the seed level in the seed drum. By turning the housing 9 so that the edge 41 or 44 is upwardly or downwardly displaced the amount of seed to be sown per unit of length may be regulated within ample limits. As an example it may be stated that with a certain setting the apparatus will sow an amount of seed $a$ and with another setting up to $15a$. The wide range of regulating the amount of sowing seed will be further explained in the following.

The amount of seed in the seed drum is indicated by the dotted line 49. In fact the seed level is not horizontal when the apparatus is in use but sloping with its top point at the arising side of the seed drum. Assume that the overflow edge 41 or 44 of the aperture 10 or recess 11 of the housing 9 is so positioned as to lie below the level line 49, the outlets moving between the overflow edge and the seed level will not only deliver the amount of seed carried along by the outlets during rotation of the seed cylinder, but also seed flowing out through the outlets so long as the latter are moving in the seed below the level line. The more the housing 9 is rotated so as to approach the overflow edge to the level line, the less seed will flow out through the outlets to the sowing chute. If the housing is turned still farther so that the overflow edge arises above the level line, only the seed carried along by the outlets will be delivered to the chute, and in still higher positions of the overflow edge some of the seed corns will fall back into the seed drum so that only a few seed corns will be delivered to the chute. Thus the apparatus provides for a scattered sowing. Whether the apparatus offers a scattered or dense sowing it has been found to provide for a uniform sowing.

The turning and setting of the housing 9 is made by means of the rotatable rod 17. When rotated in either direction the rod 17 will be longitudinally displaced because it is threaded into the block 20, and carry the lever 12 along thus turning the housing 9 around its axis. The setting of the housing 9 may be registered on a scale 45.

In Fig. 7 a special embodiment of the seed cylinder is shown. In this embodiment two rows of outlets 46 and 47 are closely juxtaposited but with the outlets in staggered relation to one another. Two such juxtaposited rows of outlets simultaneously receiving seed and delivering the same over the edge of an aperture shown in dotted lines in the housing surrounding the seed drum, are intended for use when the amount of seed to be sown for various reasons is desired to be rather great. Of course the two co-operating rows of outlets may be placed so that by a suitable axial displacement of the housing one of the rows may be covered so that only the other row will act.

The design of the seed drum may vary within ample limits without exceeding the scope of invention. To enable group sowing by means of the apparatus a seed drum may for instance be provided with a row having only few outlets, probably only a single outlet, discharging the seed in portions with a suitable distance between the portions so as to sow groups of plants. The outlet or outlets should in this case have a relatively large diameter so as to receive more seed corns at a time and simultaneously discharge the same through the outlets. The number of seed corns received and discharged through the outlet or outlets may be regulated by the above mentioned adjustment of the level of the overflow edge.

For some types of seed, such as for instance legumes, the walls of the seed drum must be relatively thick in order to give the outlets the necessary depth so as to form, together with a considerable chamfering of the outlets, sufficiently big pockets for receiving for instance peas.

For other types of seed, for instance cucumber seed the inner side of the seed drum must be provided with spoons near one edge of the outlets for receiving the cucumber seed separately or in portions in the form of seed groups, and for discharging the same through the outlets.

The above mentioned thickness of the seed drum wall varying according to the size of the seed may also be had in a single seed drum as shown in Fig. 8, when said seed drum is so designed that its inner wall is tapered in such a manner as to be thickest near the row of outlets having the greatest diameter and decreasing towards the row of outlets having the smallest diameter. It is hereby simultaneously obtained that during rotation of the seed drum the small seed will be liable to move towards the outlets with the small diameter, thus facilitating a complete emptying of the seed drum.

The seed drum must also be provided with two or more rows of outlets of the same size and so arranged that seed is simultaneously received and discharged over an overflow edge into two or more sowing chutes. In this case the apparatus will sow two or more rows at the same time.

The seed drum may be fixed to the shaft 7 in various other manners than the above described.

The housing surrounding the seed drum may be so designed as to cover the lower half only or somewhat more of the seed drum, and to be forced somewhat apart from the seed drum against the action of springs. This design is preferable when probable impurities in the seed enter the space between the seed drum and the housing, because such impurities will not become jammed between the seed drum and the housing when the latter is resiliently mounted, and thereby not oppose the operation of the apparatus but will be automatically discharged during rotation of the seed drum.

The parts of the housing covering the outlet rows which shall not discharge seed into the chute, need not either necessarily be integral with the housing but may be in the form of strips or flaps mounted pivotally, slidably or removably on the housing. In this case it is not necessary that the housing is axially slidable because the rows of outlets, which must be completely covered in order to become ineffective, may be covered by the strips or flaps slidably or removably mounted on the housing.

The free aperture above the overflow edge must be so long that the seed can leave the outlets in the seed drum without being jammed between the other edge of the aperture in the housing parallel to the overflow edge, and the seed drum.

The housing surrounding the seed drum may also be designed in various other manners. The design of the housing depends upon the number of rows of outlets provided in the seed drum, and whether these rows are intended to work separately, in pairs or simultaneously for receiving the seed and discharge the same over the overflow edge through an aperture or recess in the housing to one or more sowing chutes or like members. If the rows of outlets provided in the seed drum are intended to separately receive and discharge seed to a sowing chute or like member, the housing may be designed as described above and shown in the drawings. The aperture or recess forming the two overflow edges may be replaced by two apertures or recesses providing the necessary overflow edges. The overflow edge may also extend freely from one edge of the housing to the other, and the row or rows of outlets which shall not discharge seed into the sowing chute may be covered by the above mentioned flaps or like members. In the latter case rows of outlets in pairs or all together may be caused to discharge seed over the overflow edge into the sowing chute by moving or swinging the flaps or like members away from the seed drum so that some outlets in the rows intended for operation during the use of the apparatus are uncovered for sowing.

In the above description the overflow edge has been in the form of the lower edge of the aperture or recess in the housing which at the same time has been pivotally mounted. However, the housing may be mounted so on the frame as not to be rotated, and the overflow edge may consist of one edge of a special member slidably mounted on the housing. This is the case in the embodiment shown in Figs. 9 and 10 where the housing even is rigidly connected to the frame, the mutual displacement between the seed drum and the housing being here effected by an axial displacement of the seed drum.

In the embodiment shown in Figs. 9 and 10 the housing 9 is integral with or rigidly connected to the storage tank 2, the sowing chute 3 and the pipe 4 for the handle 5. The shaft 7 is journalled in the same manner as in the embodiment according to Figs. 1 to 5 and carries also the wheel 6. The free end 49 of the shaft 7 is, however, in the embodiment shown in Figs. 9 and 10 formed with a square head and carried through the square hole 33 in the end wall 32 of the seed drum 8 pivotally mounted in the housing 9. Thus the seed drum is forced to rotate with the shaft 7 but may also slide along said shaft. To fix the seed drum in the set position, i. e. in a position in which either of the rows of outlets 25, 26 and 27 is opposite to the aperture 10 in the housing 9, three holes 50, 51 and 52 are provided in the square head 49 of the shaft 7 for engagement with a pin 53 slidably mounted on the end wall 32 of the seed drum 8. The pin 53 is held in position by means of a compression spring 54 inserted between the upper end of the pin 53 bent in the form of a handle, and a projection 55 on the wall 32. This embodiment also comprises the flange 29 serving as a guide for the inner open end of the seed drum and having such a length that said end of the seed drum may engage the flange irrespectively of the position in which the seed drum is set.

In the inner wall of the housing 9 and opposite to the aperture 10 an annular groove 56 is provided being somewhat larger than the aperture 10 and having slidably mounted therein a guide plate 57 concentric with the seed drum, the ends of said plate having a distance corresponding to the length of the aperture 10. To the upper end of said guide plate a screw 58 is secured which is carried through a circumferential slit 59 formed in the housing 9 opposite to the groove 56 so that by means of the screw 58 the guide plate 57 may be displaced in the groove 56. On the free end of the screw 58 a finger nut 60 is mounted which may serve partly as a handle, partly for clamping the guide plate in set position.

By means of the handle 60 and the screw 58 the guide plate 57 may therefore be so displaced in the groove 56 that its lower edge 61 operating as an overflow edge may be displaced more or less upwards in the aperture 10 so as to adjust the amount of seed to be sown per unit of length as above described.

Also the embodiment shown in Figs. 9 and 10 may be varied in many ways without exceeding the scope of the invention. Thus all the special forms of execution of the seed drum mentioned in connection with Figs. 1 to 5 may also be used in connection with the embodiment shown in Figs. 9 and 10. Furthermore, the connection of the seed drum with the shaft and its adjustment relatively thereto may be made in many other ways than those described. The guide plate 57 may also be designed in various other manners than that shown in the drawings. For instance this guide plate may be given the form of a special cylinder totally surrounding the seed drum and having an aperture corresponding to the aperture in the housing, the lower edge of said aperture forming the overflow edge. In this case the guide plate ought to have such a width that irrespectively of the row of outlets being opposite to the aperture 10 in the housing 9, it will always cover the other rows of outlets so that no seed may force its way into the space between the seed drum and the housing.

The guide plate described with reference to Figs. 9 and 10 may also be used in connection with an axially slidable housing 9 and a not slidable seed drum.

I claim:

1. An apparatus for sowing seeds having a frame, a seed drum rotatably mounted in the frame and having outlets along its circumference, a housing closely surrounding the drum and having at least one aperture positioned to receive seeds coming from the drum outlets, a sowing chute communicating with the housing aperture, the provision of said housing aperture having a bottom overflow edge, and means for adjusting the overflow edge of the housing aperture to adjust its level relative to the rotational axis of the seed drum at which the housing aperture uncovers the drum outlets as the drum rotates.

2. An apparatus according to claim 1, wherein the housing is pivotally mounted concentric with the seed drum.

3. An apparatus according to claim 1, wherein said means comprises a guide plate slidably mounted between the housing and the seed drum and having one free edge constituting said overflow edge.

4. An apparatus according to claim 3, wherein said guide plate is slidably mounted in a groove on the inner side of the housing.

5. An apparatus according to claim 3, wherein the guide plate completely surrounds the seed drum and has an aperture corresponding to the aperture in the housing, the lower edge of said aperture forming the overflow edge.

6. An apparatus according to claim 1, in which the seed drum has at least two rows of outlets, and in which the housing is provided with at least two apertures and is axially displaceable relatively to the seed drum.

7. An apparatus according to claim 6, wherein the seed drum is adjustably and axially slidably mounted in the housing, the seed drum being axially fixed.

8. An apparatus according to claim 6 wherein the seed drum has two rows of outlets provided within the width of an aperture in the housing.

9. An apparatus according to claim 8, wherein the outlets in the two rows are mutually displace circumferentially of the seed drum.

10. An apparatus according to claim 1 wherein the outlets are radially bored with a diameter corresponding to the size of the type of seed to be sown through the outlets, said outlets being chamfered along one half of their circumference opposite to the interior of the housing for the formation of pockets to receive the seed.

11. An apparatus according to claim 2, wherein the housing is provided with a bell crank lever with notches engageable by the free enlarged end of a rod longitudinally slidably and pivotally mounted in the frame of the apparatus.

12. An apparatus according to claim 11, wherein the rod is threaded for co-operation with a threaded hole in a member pivotally mounted in the frame, said member being spring urged in a direction to hold the rod in engagement with the lever.

GÖSTA HYLTÉN-CAVALLIUS.

REFERENCES CITED

The following references are of record in the file of this patent:

UNITED STATES PATENTS

| Number | Name | Date |
| --- | --- | --- |
| 1,731,515 | Andrews et al. | Oct. 15, 1929 |
| 1,928,908 | Palmer | Oct. 3, 1933 |
| 2,115,167 | Hoke | Apr. 26, 1938 |